United States Patent [19]

Nakao

[11] Patent Number: 5,553,049
[45] Date of Patent: Sep. 3, 1996

[54] REPRODUCTION OF DIGITAL AUDIO DATA OPTICALLY RECORDED IN A MOTION PICTURE FILM

[75] Inventor: Takashi Nakao, Saitama, Japan

[73] Assignee: Sony Corporation, Tokyo, Japan

[21] Appl. No.: 330,374

[22] Filed: Oct. 27, 1994

[30] Foreign Application Priority Data

Oct. 28, 1993 [JP] Japan ................................. 5-270441

[51] Int. Cl.[6] .............................. G11B 3/76; G11B 7/00; G03B 31/06
[52] U.S. Cl. ...................... 369/100; 369/273; 369/275.1; 352/27; 352/37; 352/5; 352/25
[58] Field of Search ............................. 352/101, 2, 27, 352/92, 25, 5, 37; 369/100, 273, 275.1

[56] References Cited

U.S. PATENT DOCUMENTS

| | | | |
|---|---|---|---|
| 4,461,552 | 7/1984 | Levine | 352/27 |
| 4,504,130 | 3/1985 | Bell et al. | 352/92 |
| 4,600,280 | 7/1986 | Clark | 352/37 |
| 5,155,510 | 10/1992 | Beard | 352/27 |
| 5,327,182 | 7/1994 | Kohut et al. | 352/27 |
| 5,453,802 | 9/1995 | Kohut et al. | 352/27 |

FOREIGN PATENT DOCUMENTS

| | | |
|---|---|---|
| 0259505 | 3/1988 | European Pat. Off. . |
| 0562823 | 9/1993 | European Pat. Off. . |

OTHER PUBLICATIONS

Patent Abstracts of Japan, vol. 14, No. 577 (P–1146) 21 Dec. 1990, JP–A–02 247 832 (Sanyo) 3 Oct. 1990.

Patent Abstracts of Japan, vol. 18, No. 26 (E–1491) 14 Jan. 1994, JP–A–05 260 257 (Fuji) 8 Oct. 1993.

Patent Abstracts of Japan vol. 9, No. 120 (P–358) 24 May 1985, JP–A–60 006 939 (Shiyouichi Hasegawa) Jan. 1985.

Asakura, T. "Oyo Kogaku", Asakura Shoten, pp. 112–119.

*Primary Examiner*—Georgia Y. Epps
*Assistant Examiner*—Kim-Kwok Chu
*Attorney, Agent, or Firm*—William S. Frommer; Alvin Sinderbrand

[57] ABSTRACT

An apparatus for optically reproducing digital speech data recorded on a motion picture film is disclosed. The digital speech data recorded on an emulsifier surface of the motion picture film is illuminated with an illuminating light from the side of a base surface of the motion picture film, and the light transmitted through the emulsifier surface is collected as an incident light by a reproducing lens. With the present apparatus, it is possible to reduce the variations in the volume of the light of the reproduced digital signals otherwise caused by the scratch of dust present on the film base surface.

9 Claims, 4 Drawing Sheets

REPRODUCTION OF DIGITAL AUDIO DATA OPTICALLY RECORDED IN A MOTION PICTURE FILM

BACKGROUND OF THE INVENTION

This invention relates to an apparatus for reproducing digital speech data optically recorded on a motion picture or the like.

If, in a transmission optical system, such as a microscope, the illumination efficiency is to be taken into account, it is desirable to equate the numerical aperture NA of the reproducing system with the numerical aperture of the illuminating system. In addition, for maximizing the resolution, it is preferred to set the numerical aperture of the illuminating system to 1.5 times as large as that of the reproducing light. Consequently, in the conventional transmitting optical system, such as the microscope, the numerical aperture of the illuminating system is set so as to not more than 1.5 times as large as that of the reproducing light. The numerical aperture of the illuminating system is given as a sine of a divergence angle of a light ray with respect to the optical axis with a pinhole placed on an illuminated surface.

It is now assumed that speech data is read from a conventional motion picture film on which speech data has been recorded as a digital pattern, and signals are read from the side of a base surface 2 of a motion picture film 1, as shown in FIG. 1. In such case, should there exist a scratch 5 on the base surface 2, and should the numerical aperture of the illuminating system be larger than the numerical aperture of the reproducing lens 4, the scratch tends to be defocused to a lesser extent, so that the light of the image of the scratch 8 on the base surface 2 is collected by the reproducing lens 4. Consequently, when the light beam collected by the reproducing lens 4 is converted into electrical signals (digital signals), the resulting signals are corrupted significantly by the scratch 5.

On the other hand, if the numerical aperture of the illuminating system is set to not more than 1.5 times of the numerical aperture of the reproducing system, the illuminating optical system of a complex structure is required, because a light guide having a larger divergence angle cannot be employed.

In addition, if the digital speech data recorded on the motion picture film i is to be reproduced, with the numerical aperture of the illuminating system being set so as to be not more than 1.5 times as large as that of the reproducing system, the scratch or dust is raised in modulation factor, so that the reproduced digital signals are affected in an increasing amount. Furthermore, if the speech data on the motion picture film 1 is to be reproduced with a higher illumination efficiency and a high S/N ratio, it is necessary to employ a reproducing lens 4 having a higher value of the numerical aperture of the reproducing system. However, in such case, the depth of focus of the reproducing lens 4 becomes shallow, such that, when the speech data on the motion picture film 1 is reproduced, the reproduced digital signals are subjected to defocusing. Conversely, when the reproducing lens 4 of an extremely deep depth of focus is employed, focusing occurs not only on an emulsifier surface having the pattern of the speech data on the motion picture film recorded thereon, but also on the base surface 2, so that the light transmitted through the scratch on the base surface 2 or the dust is also collected, and hence the reproduced digital signal is affected significantly by the scratch or dust.

OBJECT AND SUMMARY OF THE INVENTION

In view of the above-depicted problems of the prior art, it is an object of the present invention to provide an apparatus for reproducing digital signals wherein, in reproducing digital signals optically recorded on the base surface of a film, it is possible to reduce adverse effects of the scratches or dust possible present on the base film surface.

According to the present invention, there is provided an apparatus for reproducing digital signals optically recorded on a film with the aid of a transmitted light, comprising the film having its one surface and its other surface as a base surface and an emulsifier surface, respectively, illuminating means for radiating a light beam onto the film from the base surface thereof, an objective lens for condensing the reproducing light from the emulsifier surface of the film, and means for producing electrical signals of a signal level related to the volume of light collected by said objective lens.

When the digital signals optically recorded on the film are reproduced with a transmitted light, the film is arranged with its base surface facing the illuminating system and with its emulsifier surface facing the objective lens, whereby the illuminating light is radiated from the side of the base surface for illuminating the digital speech data pattern recorded on the emulsifier surface. Consequently, it becomes possible to reduce the variation in the volume of the light of the reproduced digital signals otherwise produced by the scratch or dust possible present on the film base surface.

Besides, by setting the numerical aperture of the illuminating system radiated from the film base surface so as to be 1.5 times of more as large as the numerical aperture of the objective lens, it becomes possible to diminish adverse effects of the scratch or dust on the reproduced digital signals. In addition, simplified illumination may be realized with the use of a light guide having a larger outgoing angle.

Furthermore, by setting the numerical aperture of the objective lens facing the emulsifier surface of the film to not less than 0.06 and not more than 0.16, the depth of focus of the objective lens can be set so as to be larger than the film surface variation along the focusing direction, so that, when reproducing the digital signals optically recorded on the film using the transmitted light, it becomes possible to provide for a margin for defocusing of the image of the scratch or dust possibly present on, the film base surface and hence to decrease the adverse effects of the scratches or dust on the reproduced digital signals.

DETAILED DESCRIPTION OF PREFERRED EMBODIMENTS

Figure 1:
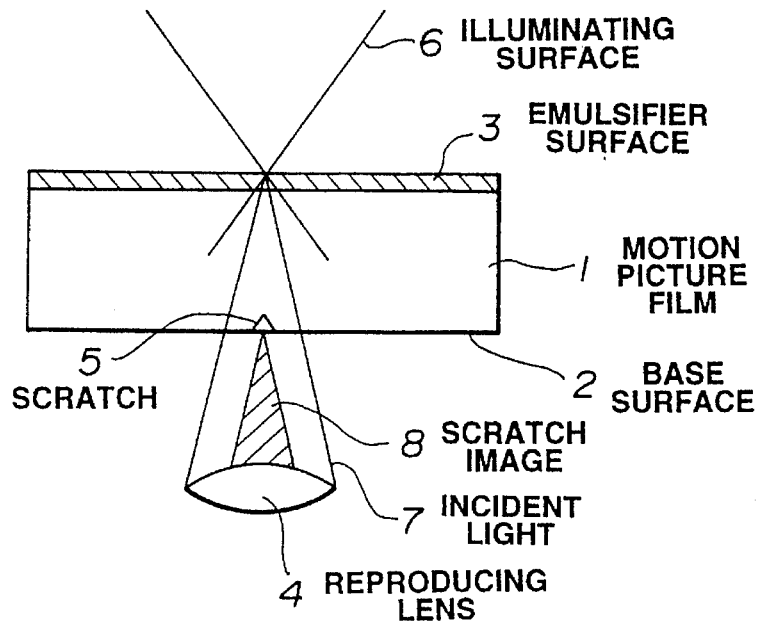
FIG. 1 shows a schematic arrangement of an apparatus employing the conventional digital signal reproducing method.
Figure 2:
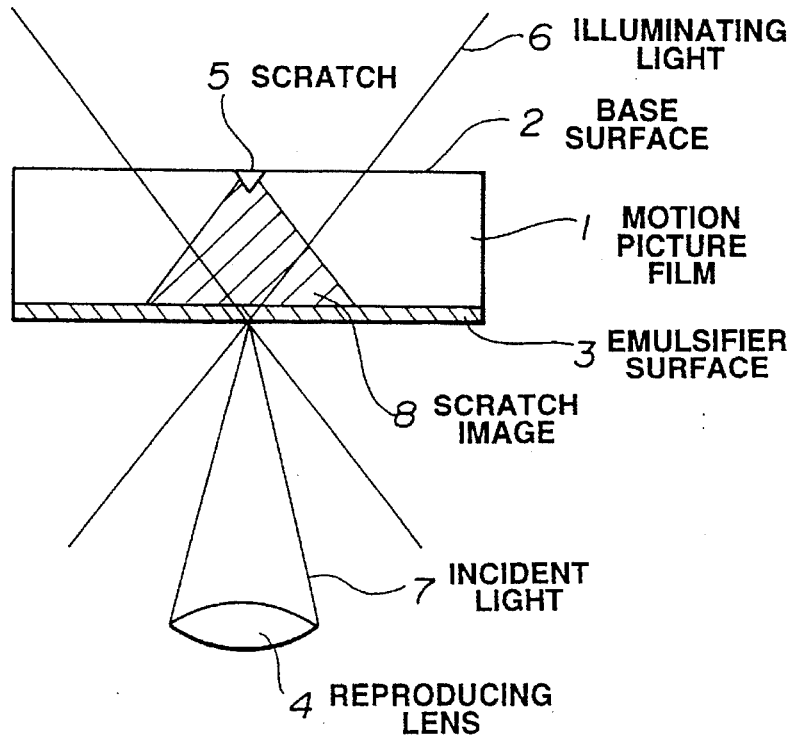
FIG. 2 shows a schematic arrangement of an apparatus for reproducing the digital signal according to the present invention.

Referring to the drawings, preferred embodiments of the present invention will be explained in detail. FIG. 2 shows a schematic arrangement for illustrating the principle of the digital signal reproducing apparatus according to the present invention.

In FIG. 2, a pattern of digitally recorded speech data on an emulsifier surface 3 of a motion picture film 1 is illuminated by an illuminating light beam 6 from a base surface 2 of the motion picture film 1. The light beam transmitted through the emulsifier surface 3 is collected as an incident light beam 7 by a reproducing lens 4.

At this time, a scratch 5 present on the base surface 2 is also illuminated by the illuminating light beam 6, so that an image 8 of the scratch 5 is formed on the emulsifier surface 3. However, since the image 8 of the scratch 5 reaching the emulsifier surface 3 is defocused so that the volume of light of the image 8 of the scratch 5 collected by the reproducing lens 4 is small. Thus the reproduced speech data is affected to a lesser extent by the scratch or dust.

Figure 3:
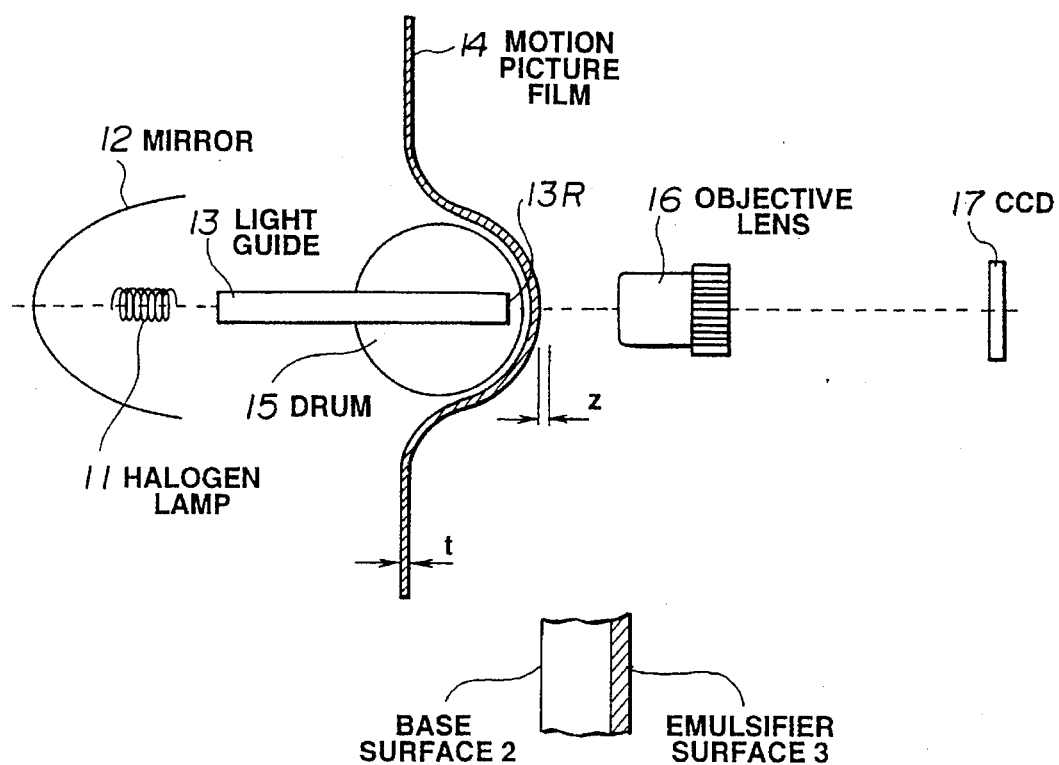
FIG. 3 shows a schematic arrangement of an apparatus for reproducing the digital signal according to an embodiment of the present invention.

FIG. 3 shows a schematic arrangement of an apparatus for carrying out the above-described digital signal reproducing method.

An illuminating light beam from a halogen lamp 11 is incident on a light guide 13 via a mirror 12 and is conducted by the light guide 13 as far as a motion picture film 14 wrapped around a drum 15. The motion picture film 14 is arranged so that the base surface 2 and the emulsifier surface 3 are directed to the halogen lamp 11 radiating the illuminating light beam and to an objective lens 18, respectively. The light guide 13 has its outgoing end 13R shaped to a rectangle for mating with an illuminated region. The illuminating light beam transmitted through the motion picture film 14 is collected by the objective lens 16 and thence routed to a CCD 17 which then outputs electrical signals of a signal level related to the received light volume.

In the present embodiment, the pattern of the speech data digitally recorded on the motion picture film 14 is imaged on the CCD 17 with a multiplication factor of four by the objective lens 16. The objective lens 16 has its depth of focus d $(=\lambda/NA^2)$ related with the thickness t of the motion film 14 and a variation (film wobbling) Z along the focusing direction of the motion picture film 4 by the following formula (1):

$$z \leqq d \leqq t \quad (1)$$

where $\lambda$ denotes the wavelength of the illuminating light and NA the numerical aperture of the objective lens 16. Meanwhile, the film variation is produced by various factors, such as mechanical tolerances of the drum, setting errors in bearings retaining the drum, film deformation produced by the film not being cut correctly to 35 mm width or film deformation produced on punching film perforations, etc.

By measurement, the thickness t of the motion picture film 14 is 160 μm, while the variation z along the focusing direction of the motion picture film 14 is 20 to 30 μm. Thus the following formula $$20 \leqq d \leqq 160 \quad (2)$$

is found from the above formula (1).

The wavelength $\lambda$ of the illuminating light outgoing from the halogen lamp 11 is 530 nm, so that the following formula (3)

$$20 \leqq 0.53/NA^2 \leqq 160 \quad (3)$$

is derived. Ultimately, the numerical aperture NA of the objective lens 16 assumes a value shown by the following formula (4):

$$0.06 \leqq NA \leqq 0.16 \quad (4)$$

Thus, by setting the numerical aperture NA of the objective lens 16 to, for example, 0.1, there is no longer a risk of the speech data reproduced from the motion picture film 14 being defocused and thereby deteriorated by variations in the motion picture film 14. On the other hand, since the image of the scratch or dust on the base surface 2 of the motion picture film 14 is defocused before reaching the objective lens 16, such scratch or dust operates less detrimentally on the reproduced digital speech data.

Meanwhile, it, is disclosed in "OYO KOGAKU" (Applied Chemistry) I, by Tatsufo Asakura, published by ASAKURA SHOTEN, that the maximum resolution is achieved when the NA of the illuminating system is set to approximately 1.5 times that of the objective lens. However, in such case, the resolution of the scratch or the dust is also undesirably elevated.

However, if the numerical aperture of the illuminating system is elevated, the transmitted light through the scratch or the dust, conducted out of the aperture of the objective lens 18, comes within the field of view of the objective lens 18, thus rendering it possible to lower the modulation factor of the scratch or the dust. Consequently, by setting the numerical aperture of the illuminating system so as to be not lower than 1.5 times that of the objective lens 18, the scratch or the dust operates less detrimentally on the reproduced speech data.

If the motion picture film 14 is arranged with its emulsifier surface directed towards the light guide 13 for illuminating the pattern of the speech data recorded on the emulsifier surface, the light transmitted through the speech data pattern is read out after being transmitted through the scratch or dust on the base surface. If the speech data pattern is illuminated from the base surface of the motion picture film 14, the illuminating light from the light guide 13 transmitted through the scratch or the dust before reaching the emulsifier surface having the speech data pattern recorded thereon.

If the adverse effect of the scratch or the dust is to be reduced, it is necessary to raise the numerical aperture of the objective lens 18 for reducing the depth of focus in order to defocuses the image of the scratch or the dust which lies ahead. However, in the latter case, it is possible to elevate the numerical aperture of the illuminating system in order to defocus the image of the scratch or the dust on the emulsifier surface.

On the other hand, since the numerical aperture of the illuminating system can be set so as to be larger than the numerical aperture of the objective lens 18 which is limited by the variations in the motion picture surface, the adverse effect of the scratch or the dust may be decreased by causing the illuminating light to fall from the base surface of the motion picture film 14.

If the numerical aperture of the illuminating system is set so as to be not less than 1.5 times as large as that of the objective lens 18, it is more preferred to arrange the emulsifier surface of the motion picture film 14 on the side of the objective lens 14 instead of on the side of the light guide 13. This diminishes the effects of the scratch or the dust present on the base surface of the motion picture film 14.

Figure 4:
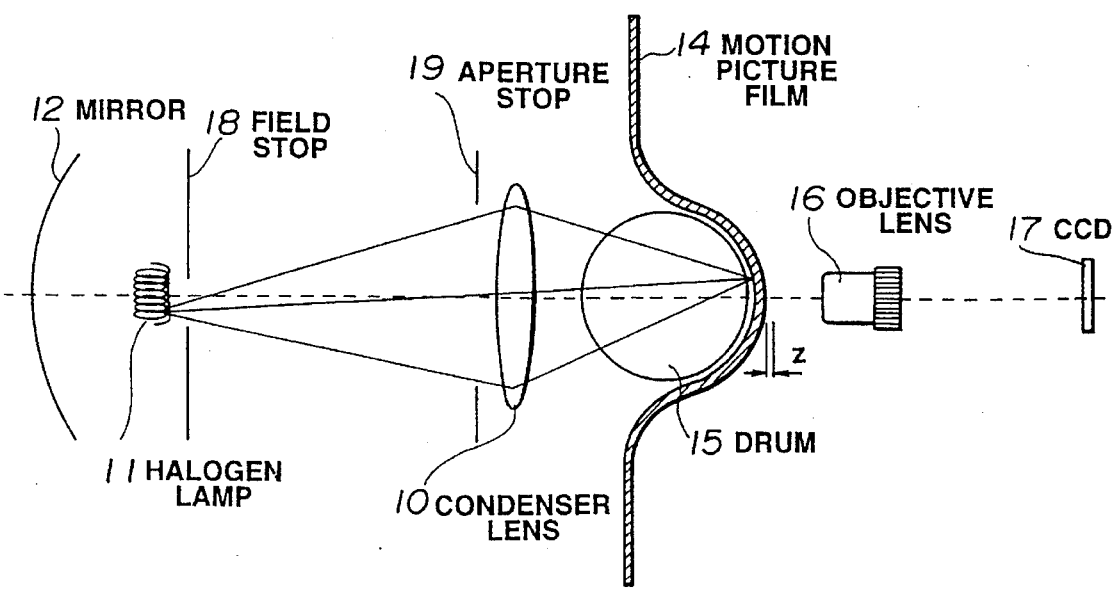
FIG. 4 shows a schematic arrangement of an apparatus for reproducing the digital signal according to a second embodiment of the present invention.
Figure 5:
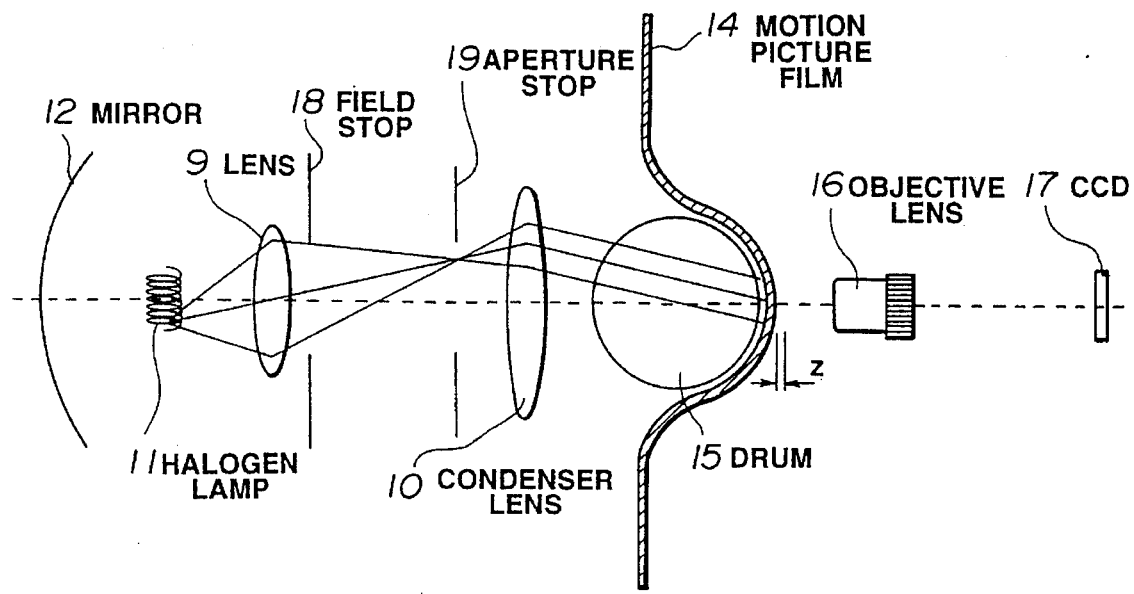
FIG. 5 shows a schematic arrangement of an apparatus for reproducing the digital signal according to a third embodiment of the present invention.
Figure 6:
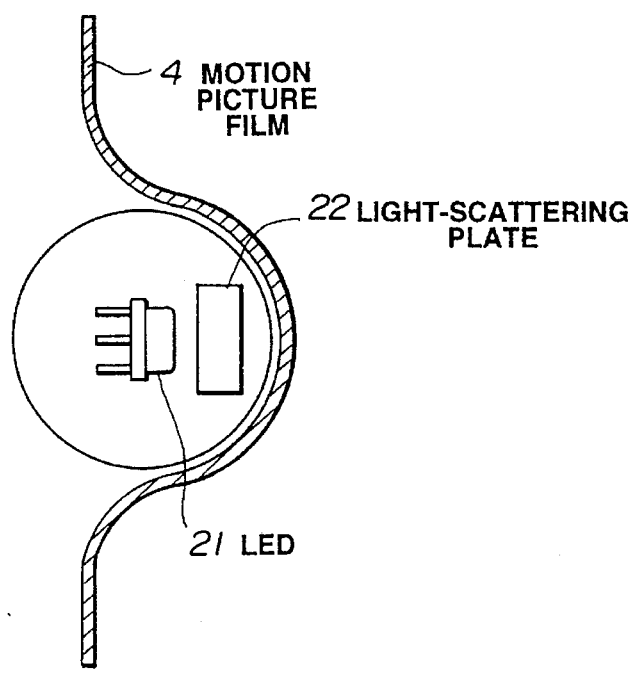
FIG. 6 shows a schematic arrangement of a light source side of the apparatus for reproducing the digital signal according to the present invention.

In the above embodiment, description has been made of reading speech data digitally recorded on the motion picture film 14 using the illumination from the light guide Alternatively, the speech data recorded on the motion picture film 14 may be read out using the critical illumination or Koehler illumination. FIGS. 4 and 5 show typical practical arrangements of the illuminating system for these cases. The signal readout side employing the transmitted light from the motion picture film 14 as the readout light is configured similarly to the arrangement shown in FIG. 3. The numerical aperture of the illuminating system denotes the condenser lens aperture ratio.

FIG. 4 shows a second practical arrangement of the digital signal reproducing apparatus employing the critical illumination. In the present arrangement, the illuminating light outgoing from a light source made up of a halogen lamp 11 and a mirror 12 is collected by a condenser lens 10 via a field stop 18 having a rectangular aperture matched to an illuminated region and an aperture stop 19 governing the numerical aperture of the illuminating system, and is caused to fall on the motion picture film 14 wrapped around the drum 15. The motion picture film 14 is arranged so that its base surface is illuminated by the illuminating light from the halogen lamp 11 and its emulsifier surface faces the objective lens 18.

FIG. 5 shows a third practical arrangement of the digital signal reproducing apparatus employing the critical illumination. In the present arrangement, the illuminating light outgoing from a light source made up of a halogen lamp 11 and a mirror 12 is collected by a lens 9 via a field stop 18 having a rectangular aperture matched to an illuminated region on an aperture stop 19 governing the numerical aperture of the illuminating system. The outgoing light from the aperture stop 19 is caused to fall via the condenser lens 10 on the motion picture film 14 wrapped around the drum 15. The motion picture film 14 is arranged so that its base surface is illuminated by the illuminating light from the halogen lamp 11 and its emulsifier surface faces the objective lens 16.

In the above-described three embodiments, the halogen lamp is employed as the light source. In place of the halogen lamp, light sources of a smaller size, such as LEDs or LDs, may also be employed. Specifically, such an illuminating device may be employed in which the outgoing light from the LED 21 is converted by a light-scattering plate 22 into a uniform illuminating light illuminating the motion picture film 14.

Figure 7:
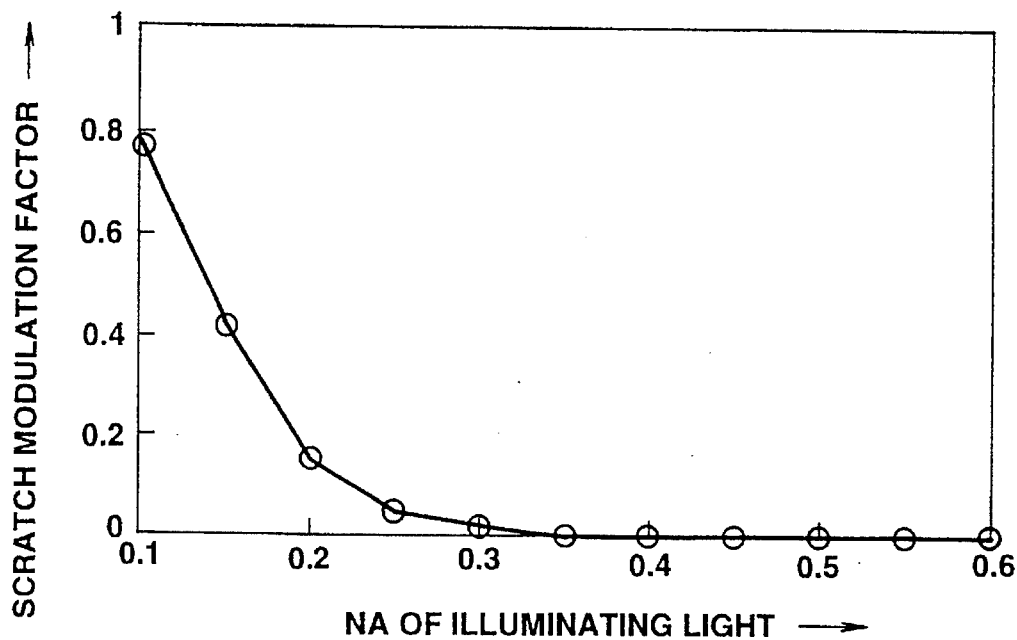
FIG. 7 is a graph showing the relation between the numerical aperture of the illuminating system and the modulation factor of the scratch with the embodiment shown in FIG. 4.
Figure 8:
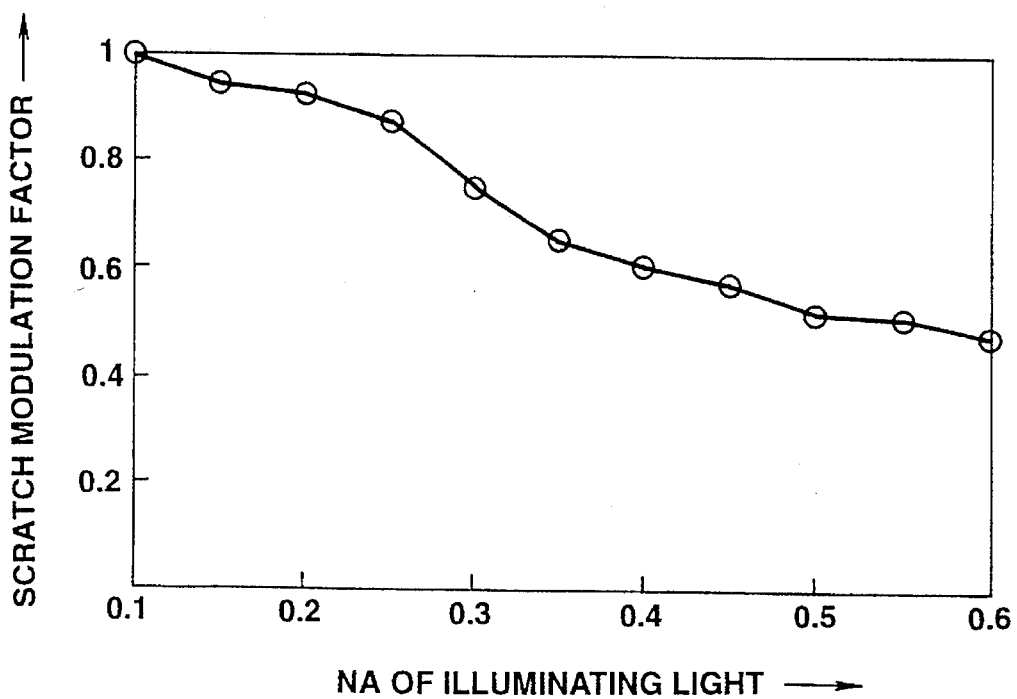
FIG. 8 is a graph showing the relation between the numerical aperture of the illuminating system and the modulation factor of the dust with the embodiment shown in FIG. 7.

FIGS. 7 and 8 respectively illustrate changes in the modulation factor of the dust with respect to the numerical aperture of the illuminating light and changes in the modulation factor of the scratch with respect to the numerical aperture of the illuminating light, for the case of employing the arrangement of FIG. 5 employing the Koehler illumination and the motion picture film 14 after a road show, that is after having been run approximately 500 times, with the numerical aperture of the objective lens 16 being set to 0.10.

If desired to maintain the modulation factor of the scratch at a value of 10% or less, it suffices if the numerical aperture of the illuminating system is set to 0.25 or higher, as shown in FIG. 7. With the noise of 10% or less, the adverse effect of the scratch on the reproduced digital speech data may be thought to be nil. Besides, if desired to lower the modulation factor, higher values of the numerical aperture of the illumination system are preferred, as shown in FIG. 8. Meanwhile, the numerical aperture of the illuminating system for the modulation factor of 50% or less is 0.50.

Thus it is seen that, for avoiding the effects of the scratch on the reproduced speech data, it is desirable to set the numerical aperture of the illuminating system so as to be equal to or higher than 0.25. If, with the embodiment of FIG. 3, the modulation factor is to be 10% or less under the above conditions, the angle of divergence of the outgoing light from the optical fiber employed in the light guide 13 (numerical aperture) is set to 0.57.

What is claimed is:

1. An apparatus for reproducing digital audio signals optically recorded on a motion picture film with the aid of an illuminating light, said film having a base surface and an emulsifier surface, comprising:

illuminating means for radiating a light beam onto said base surface of said film to aid in the reproduction of said digital audio signals, an objective lens for condensing a reproducing light from said emulsifier surface of said film, and means for producing electrical signals of an audio signal level related to a volume of light collected by said objective lens.

2. The apparatus according to claim 1 wherein a numerical aperture of said illuminating means is set greater than or equal to 1.5 times that of said objective lens.

3. The apparatus according to claim 2 wherein the numerical aperture of said illuminating means is set greater than equal to 1.5 times that of said objective lens, and wherein the numerical aperture of said objective lens is set greater than or equal to 0.06 and less than or equal to 0.16.

4. The apparatus according to claim 1 wherein a depth of focus of said objective lens is greater than or equal to a variation of said film along the focusing direction and less than or equal to a thickness of said film.

5. The apparatus according to claim 4 wherein a numerical aperture of said objective lens is set greater than or equal to 0.06 and less than or equal to 0.16.

6. The apparatus according to claim 1 wherein said illuminating means comprises a light source and a light guide for radiating the light beam from said light source at a pre-set position on said film, and wherein said means for producing electrical signals is a CCD.

7. The apparatus according to claim 6 wherein the numerical aperture of said illuminating means is set greater than or equal to 1.5 times that of said objective lens, and wherein the numerical aperture of said objective lens is set greater than or equal to 0.06 and less than or equal to 0.16.

8. The apparatus according to claim 1 wherein said illuminating means includes a light source, a field stop for adjusting a field of view of the light beam from said light source to match an illuminated region, an aperture stop for setting the numerical aperture of said illuminating means to a pre-set value, and a lens for collecting the light beam via said aperture stop for radiating the light beam at a pre-set position on said film, and wherein said means for producing electrical signals is a CCD.

9. The apparatus according to claim 8 wherein the numerical aperture of said illuminating means is set greater than or equal to 1.5 times that of said objective lens, and wherein the numerical aperture of said objective lens is set greater than or equal to 0.06 and less than or equal to 0.16.

* * * * *